US010787928B2

(12) United States Patent
Tompkins et al.

(10) Patent No.: US 10,787,928 B2
(45) Date of Patent: Sep. 29, 2020

(54) CASING FOR USE IN A TURBOFAN ENGINE AND METHOD OF SCAVENGING FLUID THEREFROM

(71) Applicant: General Electric Company, Schenectady, NY (US)

(72) Inventors: Andrew Michael Tompkins, Cincinnati, OH (US); Brandon Wayne Miller, Liberty Township, OH (US); Donald Albert Bradley, Cincinnati, OH (US); Michele Gravina, Minervino Murge (IT); Daniel Alan Niergarth, Cincinnati, OH (US); Lorenzo Cipolla, Turin (IT)

(73) Assignees: General Electric Company, Schenectady, NY (US); GE Avio, S.r.l., Rivalta di Turin (IT)

( * ) Notice: Subject to any disclaimer, the term of this patent is extended or adjusted under 35 U.S.C. 154(b) by 782 days.

(21) Appl. No.: 15/364,294

(22) Filed: Nov. 30, 2016

(65) Prior Publication Data

US 2017/0152760 A1    Jun. 1, 2017

(30) Foreign Application Priority Data

Dec. 1, 2015    (IT) .......................... 102015000078920

(51) Int. Cl.
*F01D 25/18* (2006.01)
*F01D 25/16* (2006.01)
*F02K 3/06* (2006.01)

(52) U.S. Cl.
CPC .............. *F01D 25/18* (2013.01); *F01D 25/16* (2013.01); *F01D 25/186* (2013.01); *F02K 3/06* (2013.01);

(Continued)

(58) Field of Classification Search
None
See application file for complete search history.

(56) References Cited

U.S. PATENT DOCUMENTS

| 1,329,720 A | 2/1920 | Meier |
| 1,436,734 A | 11/1922 | Stoffer |

(Continued)

FOREIGN PATENT DOCUMENTS

| CN | 103261592 A | 8/2013 |
| CN | 103883401 A | 6/2014 |

(Continued)

OTHER PUBLICATIONS

Machine Translation and Notification of Reasons for Refusal issued in connection with corresponding JP Application No. 2016-222581 dated Nov. 14, 2017.

(Continued)

*Primary Examiner* — Kayla Mccaffrey
(74) *Attorney, Agent, or Firm* — Dority & Manning, P.A.

(57) ABSTRACT

A casing for use in a turbofan engine is provided. The casing includes an inner hub, an intermediate casing positioned radially outward from the inner hub, an outer casing positioned radially outward from the intermediate casing, and a plurality of struts spaced circumferentially about the inner hub and extending between the inner hub and the outer casing. At least one strut of the plurality of struts includes a flow channel extending therethrough. The casing also includes a fluid scoop defined within the inner hub, and a collector that couples the fluid scoop in flow communication with the flow channel.

20 Claims, 6 Drawing Sheets

(52) U.S. Cl.
CPC .. *F05D 2220/36* (2013.01); *F05D 2260/4031* (2013.01); *F05D 2260/40311* (2013.01); *Y02T 50/671* (2013.01)

(56) References Cited

U.S. PATENT DOCUMENTS

| | | | |
|---|---|---|---|
| 2,652,296 A | 9/1953 | Palmgren et al. | |
| 2,853,948 A | 9/1958 | Aspelin | |
| 3,325,232 A | 6/1967 | Pabst et al. | |
| 3,452,542 A * | 7/1969 | Saferstein | F01D 9/065 60/752 |
| 3,692,372 A | 9/1972 | Pineo | |
| 4,076,452 A | 2/1978 | Hartmann | |
| 4,177,693 A | 12/1979 | Ivanko et al. | |
| 4,235,485 A | 11/1980 | Reiter | |
| 4,428,628 A | 1/1984 | Brown | |
| 4,479,682 A | 10/1984 | Olivier | |
| 4,891,934 A | 1/1990 | Huelster | |
| 4,968,158 A | 11/1990 | Atkinson et al. | |
| 4,971,457 A | 11/1990 | Carlson | |
| 5,107,676 A * | 4/1992 | Hadaway | F01D 25/18 184/6.11 |
| 5,119,905 A | 6/1992 | Murray | |
| 5,121,599 A | 6/1992 | Snyder et al. | |
| 5,121,815 A | 6/1992 | Franscois et al. | |
| 5,272,868 A | 12/1993 | Ciokajlo et al. | |
| 5,441,351 A | 8/1995 | Grunze | |
| 6,058,694 A | 5/2000 | Ackerman et al. | |
| 6,979,131 B1 | 12/2005 | Lippert et al. | |
| 7,293,920 B2 | 11/2007 | Arena | |
| 7,490,460 B2 | 2/2009 | Moniz et al. | |
| 7,883,438 B2 | 2/2011 | McCune | |
| 7,918,649 B2 | 4/2011 | Nakagawa et al. | |
| 8,075,438 B2 | 12/2011 | Vetters et al. | |
| 8,083,030 B2 | 12/2011 | Portlock | |
| 8,256,576 B2 | 9/2012 | Glahn et al. | |
| 8,261,527 B1 | 9/2012 | Stearns et al. | |
| 8,348,803 B2 | 1/2013 | Matsuoka et al. | |
| 8,393,799 B2 | 3/2013 | Dahl | |
| 8,398,525 B2 | 3/2013 | Matsuoka et al. | |
| 8,511,057 B2 * | 8/2013 | Fomison | F01D 25/18 60/39.094 |
| 8,517,672 B2 | 8/2013 | McCooey | |
| 8,535,009 B2 | 9/2013 | Hofmann | |
| 8,740,464 B2 | 6/2014 | Berns | |
| 8,747,272 B2 | 6/2014 | Imai et al. | |
| 8,777,792 B2 | 7/2014 | Imai et al. | |
| 8,869,940 B2 | 10/2014 | Johnson et al. | |
| 8,968,148 B2 | 3/2015 | Matsuoka et al. | |
| 8,969,148 B2 | 3/2015 | Vinet et al. | |
| 8,985,277 B2 | 3/2015 | Hetherington et al. | |
| 9,038,779 B2 | 5/2015 | McCune et al. | |
| 9,909,453 B2 | 3/2018 | Fang et al. | |
| 2001/0047647 A1 | 12/2001 | Cornet | |
| 2005/0041901 A1 | 2/2005 | Yakura et al. | |
| 2005/0148425 A1 | 7/2005 | Nakagawa et al. | |
| 2008/0121376 A1 | 5/2008 | Schwarz et al. | |
| 2010/0027932 A1 | 2/2010 | Fujiwara | |
| 2010/0107648 A1 | 5/2010 | Bulin et al. | |
| 2011/0030385 A1 | 2/2011 | Ellans et al. | |
| 2012/0328431 A1 | 12/2012 | Davis | |
| 2013/0017089 A1 | 1/2013 | Stiesdal | |
| 2013/0047624 A1 | 2/2013 | Suciu et al. | |
| 2013/0129269 A1 | 5/2013 | Grehn | |
| 2013/0192258 A1 | 8/2013 | Kupratis et al. | |
| 2013/0269479 A1 | 10/2013 | van der Merwe et al. | |
| 2013/0318939 A1 | 12/2013 | Parnin et al. | |
| 2014/0075916 A1 | 3/2014 | Augros | |
| 2014/0109589 A1 | 4/2014 | Pritchard, Jr. et al. | |
| 2014/0161591 A1 | 6/2014 | Venter | |
| 2014/0241851 A1 | 8/2014 | Demitraszek et al. | |
| 2014/0256494 A1 | 9/2014 | Lewis et al. | |
| 2015/0030273 A1 | 1/2015 | Sebald et al. | |
| 2015/0377343 A1 | 12/2015 | Fugel et al. | |
| 2017/0089218 A1 | 3/2017 | Hasting et al. | |
| 2017/0089219 A1 | 3/2017 | Hasting et al. | |
| 2017/0108113 A1 | 4/2017 | Hasting et al. | |

FOREIGN PATENT DOCUMENTS

| | | |
|---|---|---|
| DE | 10 2005 029 075 A1 | 12/2006 |
| DE | 10 2013 207 780 A1 | 8/2014 |
| EP | 1 389 671 A2 | 2/2004 |
| EP | 1 574 731 A2 | 9/2005 |
| EP | 2538055 A2 | 12/2012 |
| EP | 2 559 913 A1 | 2/2013 |
| FR | 2 970 504 A1 | 7/2012 |
| GB | 1 550 789 A | 8/1979 |
| JP | S50-136508 A | 10/1975 |
| JP | H01-110825 A | 4/1989 |
| JP | H04-318230 A | 11/1992 |
| JP | H09-317406 A | 12/1997 |
| JP | 2007-263357 A | 10/2007 |
| JP | 2008-106746 A | 5/2008 |
| JP | 2010-065682 A | 3/2010 |
| JP | 2010-525234 A | 7/2010 |
| JP | 2014-122625 A | 7/2014 |
| WO | 2012/049322 A1 | 4/2012 |
| WO | 2012/069274 A1 | 5/2012 |
| WO | 2012/098324 A1 | 7/2012 |
| WO | 2014/123857 A1 | 8/2014 |
| WO | 2014/123863 A2 | 8/2014 |
| WO | 2014/152347 A2 | 9/2014 |
| WO | 2015026899 A1 | 2/2015 |
| WO | 2015/055291 A1 | 4/2015 |

OTHER PUBLICATIONS

First Office Action and Search issued in connection with corresponding CN Application No. 201611089599.6 dated Dec. 20, 2017.

Unofficial English Transaltion of Italian Search Report and Opinion issued in connection with corresponding IT Application No. 102015000078920 dated Aug. 24, 2016.

Extended European Search Report and Opinion issued in connection with related EP Application No. 16170161.0 dated Oct. 24, 2016.

Extended European Search Report and Opinion issued in connection with related EP Application No. 16190098.0 dated Feb. 7, 2017.

Office Action issued in connection with related CA Application No. 2928973 dated Mar. 13, 2017.

Extended European Search Report and Opinion issued in connection with related EP Application No. 16193771.9 dated Mar. 23, 2017.

Extended European Search Report and Opinion issued in connection with related EP Application No. 16190097.2 dated Mar. 23, 2017.

Extended European Search Report and Opinion issued in connection with corresponding EP Application No. 16200478.2 dated Apr. 5, 2017.

Japanese Search Report issued in connection with related JP Application No. 2016-095708 dated Apr. 21, 2017.

Notification of Reasons for Refusal issued in connection with related JP Application No. 2016-095708 dated May 9, 2017.

First Office Action and Search issued in connection with related CN Application No. 201610333609.X dated Jun. 20, 2017.

Decision to Grant issued in connection with related JP Application No. 2016-095708 dated Jul. 4, 2017.

Office Action issued in connection with related CA Application No. 2942693 dated Jul. 26, 2017.

Fang, et al., May 19, 2015, U.S. Appl. No. 14/715,717.
Hasting, et al., Oct. 19, 2015, U.S. Appl. No. 14/886,372.
Hasting, et al., Sep. 25, 2015, U.S. Appl. No. 14/865,265.
Hasting, et al., Sep. 25, 2015, U.S. Appl. No. 14/865,239.

* cited by examiner

CASING FOR USE IN A TURBOFAN ENGINE AND METHOD OF SCAVENGING FLUID THEREFROM

BACKGROUND

The field of the disclosure relates generally to turbofan engines and, more particularly, to systems and methods of scavenging lubricating fluid within a turbofan engine.

At least some known gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a second drive shaft. The low-pressure turbine rotatably drives the fan through the second drive shaft.

The drive shafts in the turbofan engine are typically supported by one or more bearings, and at least some known turbofans include a speed-reducing gearbox coupled along the drive shaft between the low-pressure turbine and the fan. The gearbox facilitates decoupling the fan tip speed from the speed of the low-pressure turbine. Lubricating fluid, such as oil, is typically provided to the shaft bearings and to the gearbox during operation of the turbofan engine. The lubricating fluid facilitates lubricating the shaft bearings and the gearbox, and also facilitates removing heat therefrom. More specifically, the lubricating fluid is typically discharged from the components being lubricated, scavenged from a fan frame cavity within the turbofan engine, and is recirculated for continued use therein. At least some known fan frames include bolt-on scoops for scavenging the lubricating fluid from the fan frame cavity. However, radial space within the fan frame cavity is generally limited, such that reducing the radial height of components positioned within the fan frame cavity is desirable.

BRIEF DESCRIPTION

In one aspect, a casing for use in a turbofan engine is provided. The casing includes an inner hub, an intermediate casing positioned radially outward from the inner hub, an outer casing positioned radially outward from the intermediate casing, and a plurality of struts spaced circumferentially about the inner hub and extending between the inner hub and the outer casing. At least one strut of the plurality of struts includes a flow channel extending therethrough. The casing also includes a fluid scoop defined within the inner hub, and a collector that couples the fluid scoop in flow communication with the flow channel.

In another aspect, a turbofan engine for use with an aircraft is provided. The turbofan engine includes a gearbox, and a casing that at least partially circumscribes the gearbox. The casing includes an inner hub, an intermediate casing positioned radially outward from the inner hub, an outer casing positioned radially outward from the intermediate casing, and a plurality of struts spaced circumferentially about the inner hub and extending between the inner hub and the outer casing. At least one strut of the plurality of struts includes a flow channel extending therethrough. The casing also includes a fluid scoop defined within the inner hub, and a collector that couples the fluid scoop in flow communication with the flow channel.

In yet another aspect, a method of assembling a casing for use with a turbofan engine is provided. The method includes positioning an intermediate casing radially outward from an inner hub, positioning an outer casing radially outward from the intermediate casing, and spacing a plurality of struts circumferentially about the inner hub. The plurality of struts extend between the inner hub and the outer casing, and at least one strut of the plurality of struts includes a flow channel extending therethrough. The method also includes defining a fluid scoop within the inner hub, and extending a collector between the fluid scoop and the flow channel such that the fluid scoop is coupled in flow communication with the flow channel.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to turbine engines, such as integral drive turbofan engines or unducted single fan turboprop engines, and methods of manufacturing thereof. More specifically, the turbine engines described herein include a casing designed to facilitate scavenging lubricating fluid from within a fan frame cavity. For example, the casing includes a fluid sump positioned at about bottom dead center of the casing, and a pair of struts that at least partially define the fluid sump. A flow channel is defined in at least one of the struts such that lubricating fluid is capable of being channeled from the fan frame cavity, through the fluid sump, and through the flow channel defined in the strut. Moreover, the casing includes at least one tangential/axial fluid scoop defined therein for collecting lubricating fluid discharged radially outward from within the fan frame cavity during operation of the turbofan engine. As such, the combination of scavenging features in the casing enable lubricating fluid to be scavenged from the fan frame cavity in a more efficient, reduced weight, and space saving manner, which results in reduced inlet diffusion loss and improved fuel burn.

Figure 1:
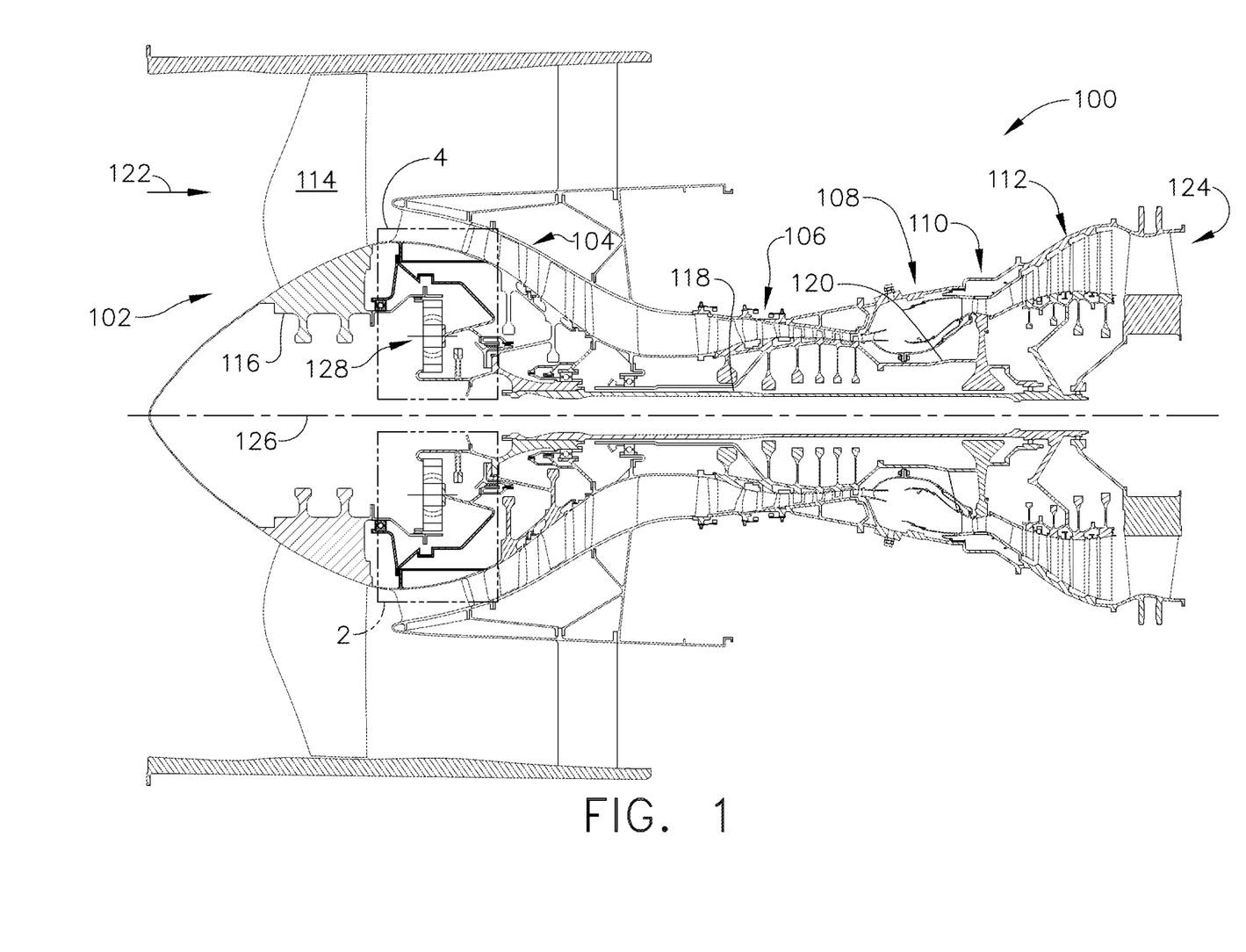
FIG. 1 is a cross-sectional illustration of an exemplary turbofan engine.

FIG. 1 is a schematic illustration of an exemplary turbofan engine 100 including a fan assembly 102, a low pressure or booster compressor 104, a high-pressure compressor 106, and a combustor assembly 108. Fan assembly 102, booster compressor 104, high-pressure compressor 106, and combustor assembly 108 are coupled in flow communication. Turbofan engine 100 also includes a high-pressure turbine 110 coupled in flow communication with combustor assembly 108 and a low-pressure turbine 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbofan engine 100 includes an intake 122, an exhaust 124, and a centerline 126 about which fan assembly 102, booster compressor 104, high-pressure compressor 106, and turbine assemblies 110 and 112 rotate. Moreover, a speed-reducing gearbox 128 is coupled along first drive shaft 118 between fan assembly 102 and low-pressure turbine 112.

In operation, air entering turbofan engine 100 through intake 122 is channeled through fan assembly 102 towards booster compressor 104. Compressed air is discharged from booster compressor 104 towards high-pressure compressor 106. Highly compressed air is channeled from high-pressure compressor 106 towards combustor assembly 108, mixed with fuel, and the mixture is combusted within combustor assembly 108. High temperature combustion gas generated by combustor assembly 108 is channeled towards turbine assemblies 110 and 112. Low-pressure turbine 112 rotates at a first rotational speed, and gearbox 128 operates such that fan assembly 102 operates at a second rotational speed lower than the first rotational speed. Combustion gas is subsequently discharged from turbine engine assembly 100 via exhaust 124.

Figure 2:
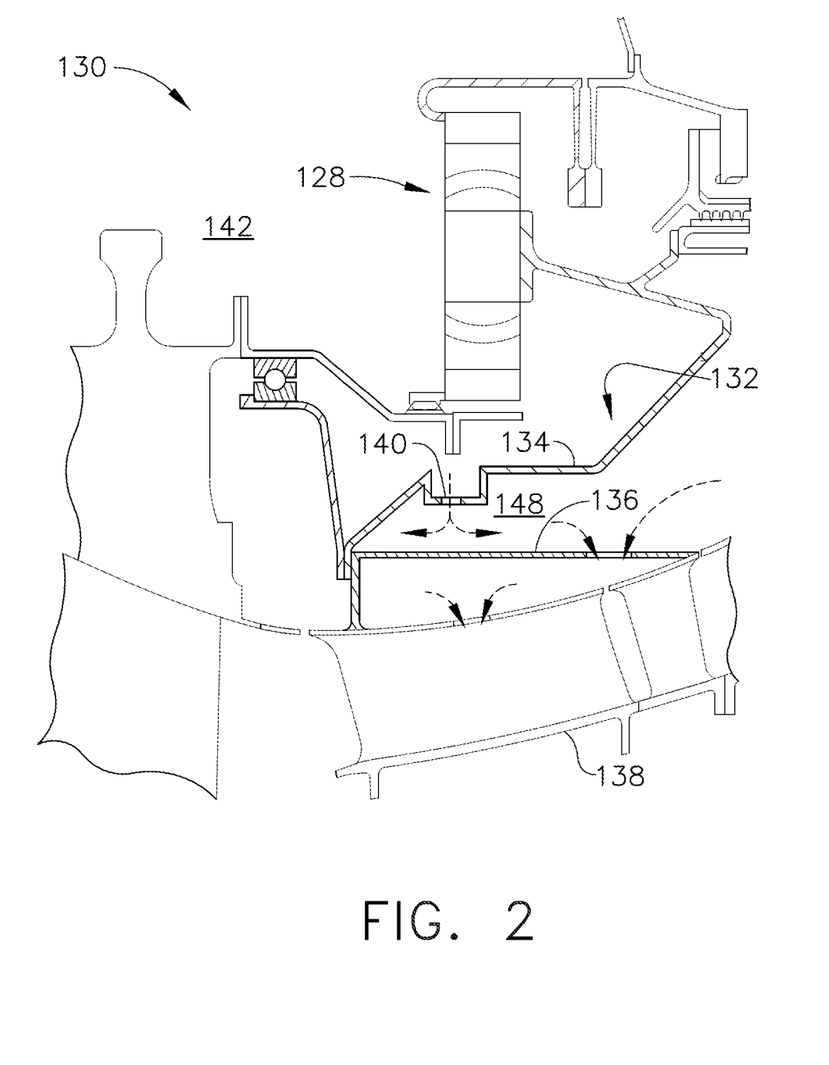
FIG. 2 is an enlarged cross-sectional illustration of a first portion of a casing that may be used in the turbofan engine shown in FIG. 1, and taken along Area 2.
Figure 3:
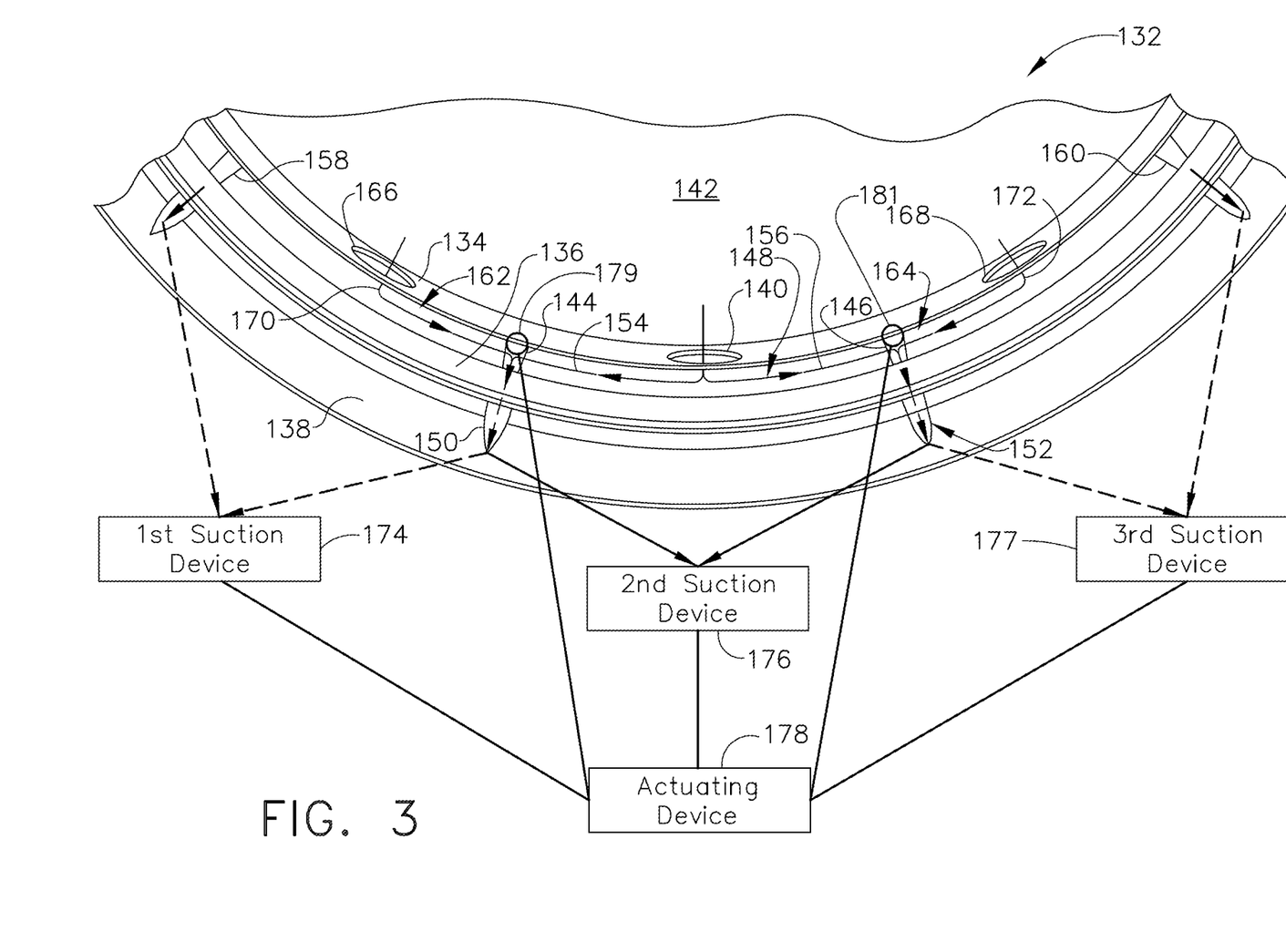
FIG. 3 is a sectional perspective view of the first portion of the casing shown in FIG. 2.

FIG. 2 is an enlarged cross-sectional illustration of a first portion 130 of a casing 132 that may be used in turbofan engine 100 (shown in FIG. 1), and FIG. 3 is a sectional perspective view of first portion 130 of casing 132. In the exemplary embodiment, casing 132 includes an inner hub 134, an intermediate casing 136 positioned radially outward from inner hub 134, and an outer casing 138 positioned radially outward from intermediate casing 136. Inner hub 134 includes a first fluid opening 140 defined at about bottom dead center of casing 132. Bottom dead center of casing 132 is generally defined at about a 180° location relative to centerline 126 (shown in FIG. 1) ± about 5° when turbofan engine 100 is viewed axially along centerline 126. As such, first fluid opening 140 is positioned to collect lubricating fluid flowing within a fan frame cavity 142 via gravity draining.

Casing 132 also includes a plurality of struts spaced circumferentially about inner hub 134 and extending between inner hub 134 and outer casing 138. In one embodiment, the plurality of struts includes a first strut 144 and a second strut 146 positioned on opposing sides of bottom dead center of casing 132 such that a first fluid sump 148 is defined between inner hub 134, intermediate casing 136, and first and second struts 144 and 146. At least one of first and second struts 144 and 146 includes a flow channel extending therethrough. More specifically, first strut 144 includes a first flow channel 150 extending therethrough, and second strut 146 includes a second flow channel 152 extending therethrough. Each strut also includes an opening (not shown) defined therein for coupling first fluid sump 148 in flow communication with each flow channel. As such, a fluid flow path is defined from first fluid opening 140, through first fluid sump 148, and through at least one of first flow channel 150 and second flow channel 152. More specifically, a first fluid flow path 154 is defined from first fluid opening 140, through first fluid sump 148, and through first flow channel 150, and a second fluid flow path 156 is defined from first fluid opening 140, through first fluid sump 148, and through second flow channel 152. First fluid flow path 154 and second fluid flow path 156 are oriented to enable lubricating fluid to be collected from fan frame cavity 142 and discharged from casing 132.

The plurality of struts also includes a third strut 158 spaced circumferentially from first strut 144 on a side that is opposite from second strut 146, and a fourth strut 160 spaced circumferentially from second strut 146 on a side that is opposite from first strut 144. A second fluid sump 162 is defined between first strut 144 and third strut 158, and a third fluid sump 164 is defined between second strut 146 and fourth strut 160. Inner hub 134 also includes a second fluid opening 166 defined therein and positioned between first and third struts 144 and 158, and a third fluid opening 168 defined therein and positioned between second and fourth struts 146 and 160. Second fluid opening 166 and third fluid opening 168 are generally offset from bottom dead center of casing 132. As such, a third fluid flow path 170 is defined from second fluid opening 166, through second fluid sump 162, and through first flow channel 150, and a fourth fluid flow path 172 is defined from third fluid opening 168, through third fluid sump 164, and through second flow channel 152. Third fluid flow path 170 and fourth fluid flow path 172 are oriented to enable lubricating fluid to be collected from fan frame cavity 142 and discharged from casing 132 when turbofan engine 100 is banked relative to a roll axis thereof. The roll axis of turbofan engine 100 is substantially coaxially aligned with centerline 126 (shown in FIG. 1).

In some embodiments, at least one suction device is coupled in flow communication with first and second flow channels 154 and 156 defined in first and second struts 144 and 146. More specifically, in one embodiment, a first suction device 174 is coupled in communication with first strut 144 and third strut 158, a second suction device 176 is coupled in communication with first strut 144 and second strut 146, and a third suction device 177 is coupled in communication with second strut 146 and fourth strut 160. The at least one suction device facilitates maintaining a negative pressure within first fluid sump 148 and, in some embodiments, within second and third fluid sumps 162 and 164 to enhance the collection of lubricating fluid therein when used in combination with gravity to drain the lubricating fluid through fluid openings 140, 166, and 168.

Moreover, in the exemplary embodiment, an actuating device 178 is coupled in communication with suction devices 174, 176, and 177, and with a first valve 179 coupled in flow communication with first flow channel 150 and a second valve 181 coupled in flow communication with second flow channel 152. Actuating device 178 is capable of determining the orientation of turbofan engine 100 relative to the roll axis thereof, and facilitates selectively actuating suction devices 174, 176, and 177 and valves 179 and 181 based on the orientation of turbofan engine 100. More specifically, actuating device 178 is operable to ensure air is not drawn through first and second flow channels 150 and 152 when turbofan engine 100 (shown in FIG. 1) rotates about its roll axis. For example, actuating device 178 causes valves 179 and 181 to be in an open position and second suction device 176 to operate when turbofan engine 100 is oriented such that first fluid opening 140 is at about the 6 o'clock position of turbofan engine 100. When second fluid opening 166 is at about the 6 o'clock position, actuating device 178 causes valve 181 to close and first suction device 174 to operate such that fluid is drawn through first strut 144 and third strut 158. Actuating device 178 operates similarly when third fluid opening 18 is at about the 6 o'clock position. As such, selectively opening and closing valves 179 and 181, and selectively operating the at least one suction device facilitates reducing the amount of air drawn through the struts based on the orientation of turbofan engine 100.

Actuating device 178 may be any suitable device that enables the system to function as described herein including, but not limited to, a float valve. As such, actuating device 178 facilitates ensuring lubricating fluid, instead of air, is drawn through either first flow channel 150 or second flow channel 152 when turbofan engine 100 is banked, thereby changing the fluid level within first fluid sump 148.

Figure 4:
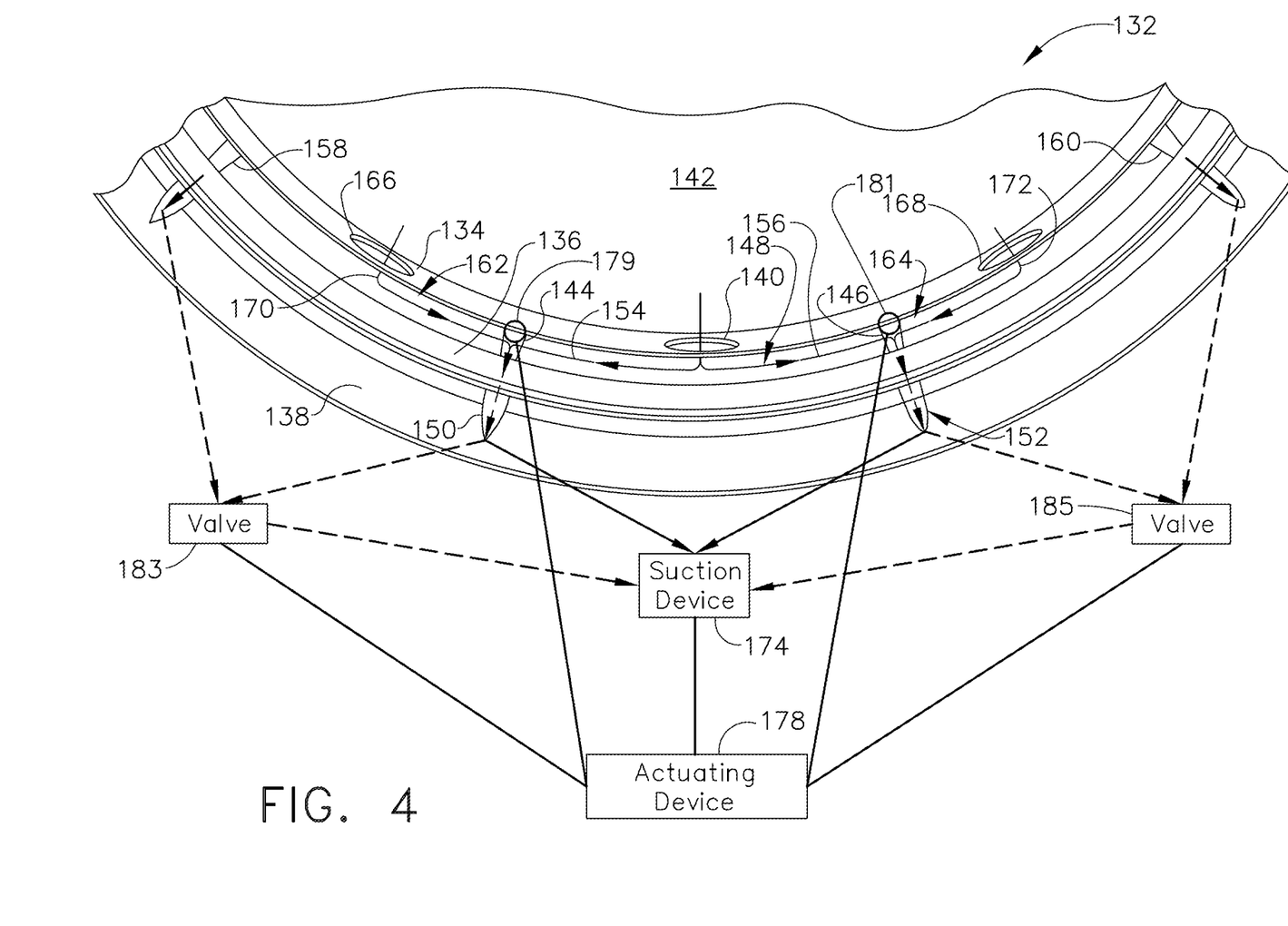
FIG. 4 is a sectional perspective view of an alternative embodiment of the first portion of the casing shown in FIG. 2.

Referring to FIG. 4, an alternative embodiment for reducing the amount of air drawn through the struts is shown. In the exemplary embodiment, a third valve 183 is coupled downstream from first strut 144 and third strut 158, and a fourth valve 185 is coupled downstream from second strut 146 and fourth strut 160. A single suction device 174 operates to create a negative pressure within the fluid sumps, and third and fourth valves 183 and 185 are selectively operable based on the orientation of turbofan engine 100 relative to its roll axis to facilitate reducing the amount of air drawn through the struts based on the orientation of turbofan engine 100.

Figure 5:
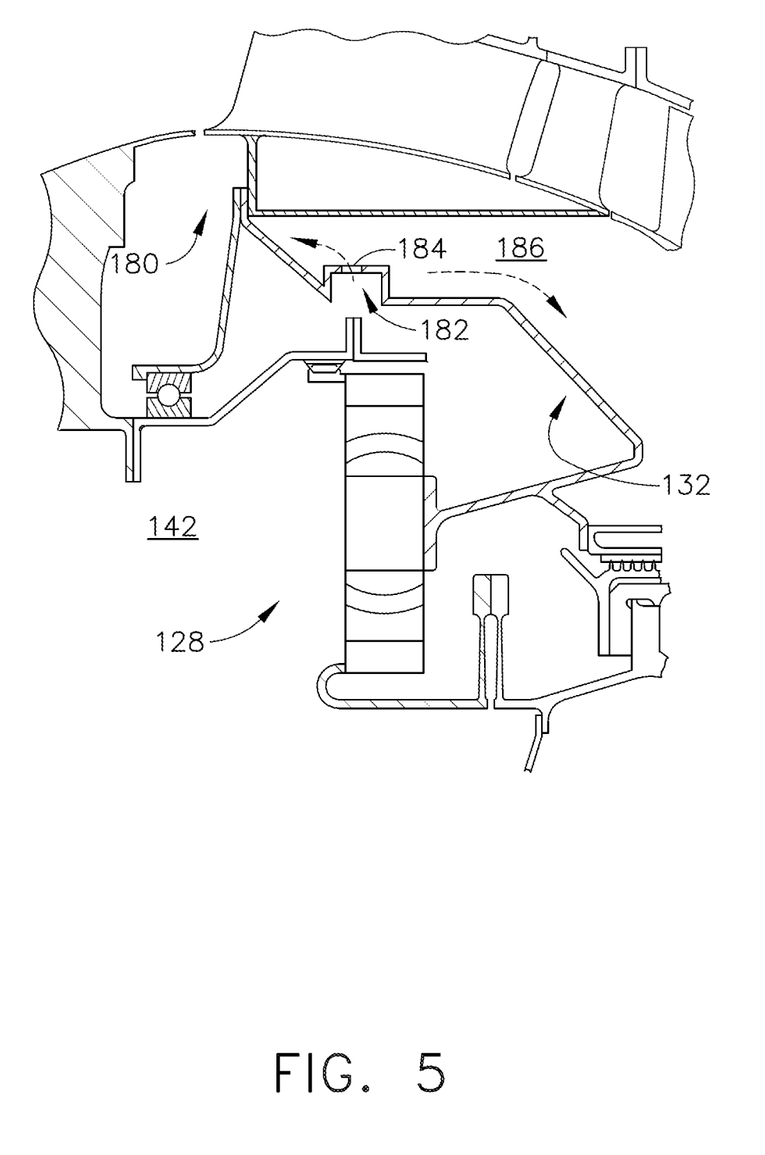
FIG. 5 is an enlarged cross-sectional illustration of a second portion of the casing that may be used in the turbofan engine shown in FIG. 1, and taken along Area 4.
Figure 6:
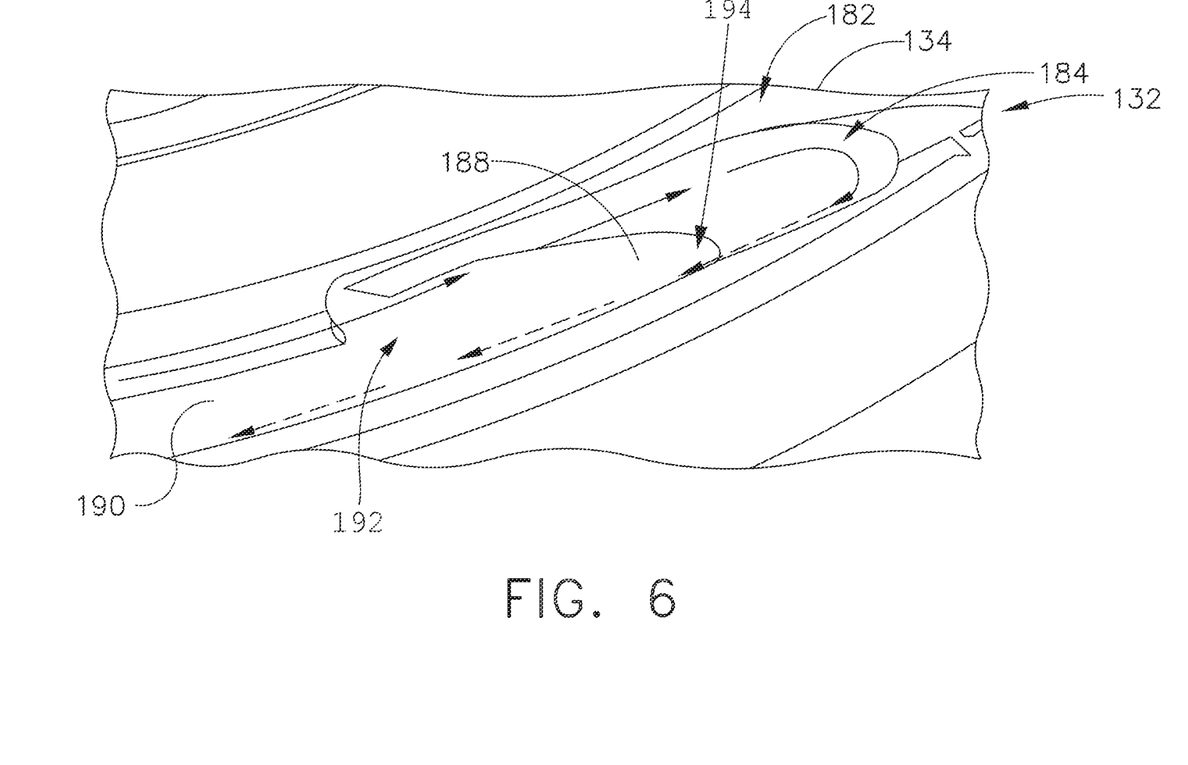
FIG. 6 is a sectional perspective view of the second portion of the casing shown in FIG. 4.

FIG. 5 is an enlarged cross-sectional illustration of a second portion 180 of casing 132 that may be used in turbofan engine 100 (shown in FIG. 1), and FIG. 6 is a sectional perspective view of second portion 180 of casing 132. In the exemplary embodiment, a fluid scoop 182 is defined within inner hub 134 at a circumferential position offset from bottom dead center of casing 132. In operation, at least a portion of the lubricating fluid is discharged radially outward towards inner hub 134. Fluid scoop 182 includes a scoop opening 184 for collecting the lubricating fluid received at inner hub 134, such that lubricating fluid is scavenged from fan frame cavity 142 in a more efficient manner. A collector 186 couples fluid scoop 182 in flow communication with the flow channels defined in at least one of first and second struts 144 and 146 (shown in FIG. 3). More specifically, collector 186 extends circumferentially within casing 132 and is at least partially defined by inner hub 134 and intermediate casing 136. As such, a fifth fluid flow path is defined from scoop opening 184, through collector 186, and through the flow channel defined in at least one of first and second struts 144 and 146. Moreover, while shown as including one fluid scoop 182, it should be understood that multiple fluid scoops may be defined within inner hub 134 at different circumferential positions thereof.

Referring to FIG. 6, fluid scoop 182 includes scoop opening 184 that is defined by a guide member 188 radially offset from a radially inner surface 190 of inner hub 134. More specifically, guide member 188 extends in a radially outward direction such that at least a portion of guide member 188 is positioned within collector 186. More specifically, guide member 188 includes a first end 192 that is substantially flush with radially inner surface 190 and a second end 194 extending from first end 192. In some embodiments, the lubricating fluid flows along radially inner surface 190 of inner hub 134. Guide member 188 is oriented such that second end 194 is circumferentially offset from first end 192 relative to centerline 126 of casing 132. As such, scoop opening 184 is formed in radially inner surface 190 in a space saving manner. Alternatively, fluid scoop 182 may be either integrally cast or welded to inner hub 134. In the exemplary embodiment, the orientation of guide member 188 is substantially aligned with the flow of lubricating fluid flowing along radially inner surface 190. The lubricating fluid within collector 186 is then capable of gravity draining towards bottom dead center of casing 132. In an alternative embodiment, fluid scoop 182 may have any configuration that enables lubricating fluid to be scavenged from fan frame cavity 142.

An exemplary technical effect of the methods, systems, and apparatus described herein includes at least one of: (a) scavenging lubricating fluid from a fan frame cavity; (b) improving utilization of the radial space under a fan hub frame; and (c) improving the scavenging efficiency of a scavenging system.

Exemplary embodiments of a scavenging system for use in a turbofan engine are described above in detail. The scavenging system is not limited to the specific embodiments described herein, but rather, components of systems and/or steps of the methods may be utilized independently and separately from other components and/or steps described herein. For example, the scavenging system may also be used in combination with other systems that would benefit from collecting fluid from a cavity, and are not limited to practice with only the systems and methods as described herein. Rather, the exemplary embodiment can be implemented and utilized in connection with many other machinery applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A casing for use in a turbofan engine, said casing comprising:
   an inner hub;
   an intermediate casing positioned radially outward from said inner hub;
   an outer casing positioned radially outward from said intermediate casing;
   a plurality of struts spaced circumferentially about said inner hub and extending from said inner hub to the outer casing, wherein at least one strut of said plurality of struts comprises a flow channel extending therethrough;
   a fluid scoop defined within said inner hub at a circumferential position offset from bottom dead center of the casing; and
   a collector that couples said fluid scoop in flow communication with said flow channel.

2. The casing in accordance with claim 1, wherein said collector extends circumferentially within the casing, and is at least partially defined by said inner hub and said intermediate casing.

3. The casing in accordance with claim 1, further comprising a suction device coupled in flow communication with the flow channel.

4. The casing in accordance with claim 1, wherein said fluid scoop comprises a scoop opening defined by a guide member that is radially offset from a radially inner surface of said inner hub.

5. The casing in accordance with claim 4, wherein said collector couples said fluid scoop in flow communication with said flow channel such that a fluid flow path is defined from said scoop opening, through said collector, and through said flow channel.

6. The casing in accordance with claim 4, wherein said guide member extends in a radially outward direction such that at least a portion of said guide member is positioned within said collector.

7. The casing in accordance with claim 4, wherein said guide member comprises a first end that is substantially flush with said radially inner surface and a second end extending from said first end, said guide member oriented such that said second end is circumferentially offset from said first end relative to a centerline of the casing.

8. A turbofan engine for use with an aircraft, said turbofan engine comprising:

a gearbox; and
a casing that at least partially circumscribes said gearbox, wherein said casing comprises:
   an inner hub;
   an intermediate casing positioned radially outward from said inner hub;
   an outer casing positioned radially outward from said intermediate casing;
   a plurality of struts spaced circumferentially about said inner hub and extending from said inner hub to the outer casing, wherein at least one strut of said plurality of struts comprises a flow channel extending therethrough;
   a fluid scoop defined within said inner hub at a circumferential position offset from bottom dead center of the casing; and
   a collector that couples said fluid scoop in flow communication with said flow channel.

9. The turbofan engine in accordance with claim 8, wherein said collector extends circumferentially within the casing, and is at least partially defined by said inner hub and said intermediate casing.

10. The turbofan engine in accordance with claim 8, further comprising a suction device coupled in flow communication with the flow channel.

11. The turbofan engine in accordance with claim 8, wherein said fluid scoop comprises a scoop opening defined by a guide member that is radially offset from a radially inner surface of said inner hub.

12. The turbofan engine in accordance with claim 11, wherein said collector couples said fluid scoop in flow communication with said flow channel such that a fluid flow path is defined from said scoop opening, through said collector, and through said flow channel.

13. The turbofan engine in accordance with claim 11, wherein said guide member extends in a radially outward direction such that at least a portion of said guide member is positioned within said collector.

14. The turbofan engine in accordance with claim 11, wherein said guide member comprises a first end that is substantially flush with said radially inner surface and a second end extending from said first end, said guide member oriented such that said second end is circumferentially offset from said first end relative to a centerline of the casing.

15. A method of assembling a casing for use with a turbofan engine, said method comprising:
   positioning an intermediate casing radially outward from an inner hub;
   positioning an outer casing radially outward from the intermediate casing;
   spacing a plurality of struts circumferentially about the inner hub, wherein the plurality of struts extend from the inner hub to the outer casing, wherein at least one strut of the plurality of struts includes a flow channel extending therethrough;
   defining a fluid scoop within the inner hub at a circumferential position offset from bottom dead center of the casing; and
   extending a collector between the fluid scoop and the flow channel such that the fluid scoop is coupled in flow communication with the flow channel.

16. The method in accordance with claim 15, wherein extending a collector comprises extending the collector circumferentially within the casing, the collector at least partially defined by the inner hub and the intermediate casing.

17. The method in accordance with claim 15, wherein defining a fluid scoop comprises defining a scoop opening in the inner hub, the scoop opening defined by a guide member that is radially offset from a radially inner surface of the inner hub.

18. The method in accordance with claim 17 further comprising extending the guide member in a radially outward direction such that at least a portion of the guide member is positioned within the collector.

19. The method in accordance with claim 17, wherein the guide member includes a first end that is substantially flush with the radially inner surface and a second end extending from the first end, said method further comprising orienting the guide member such that the second end is circumferentially offset from the first end relative to a centerline of the casing.

20. A casing for use in a turbofan engine, said casing comprising:
    an inner hub;
    an intermediate casing positioned radially outward from said inner hub;
    an outer casing positioned radially outward from said intermediate casing;
    a plurality of struts spaced circumferentially about said inner hub and extending from said inner hub to the outer casing, wherein at least one strut of said plurality of struts comprises a flow channel extending therethrough;
    a fluid scoop defined within said inner hub, said fluid scoop comprising a scoop opening defined by a guide member radially offset from a radially inner surface of said inner hub, wherein said guide member comprises a first end substantially flush with said radially inner surface and a second end extending from said first end, said guide member oriented such that said second end is circumferentially offset from said first end relative to a centerline of the casing; and
    a collector that couples said fluid scoop in flow communication with said flow channel.

* * * * *